H. D. KELLY.
HOT MILK SERVING URN.
APPLICATION FILED JULY 15, 1912.
1,189,576.
Patented July 4, 1916.
2 SHEETS—SHEET 1.
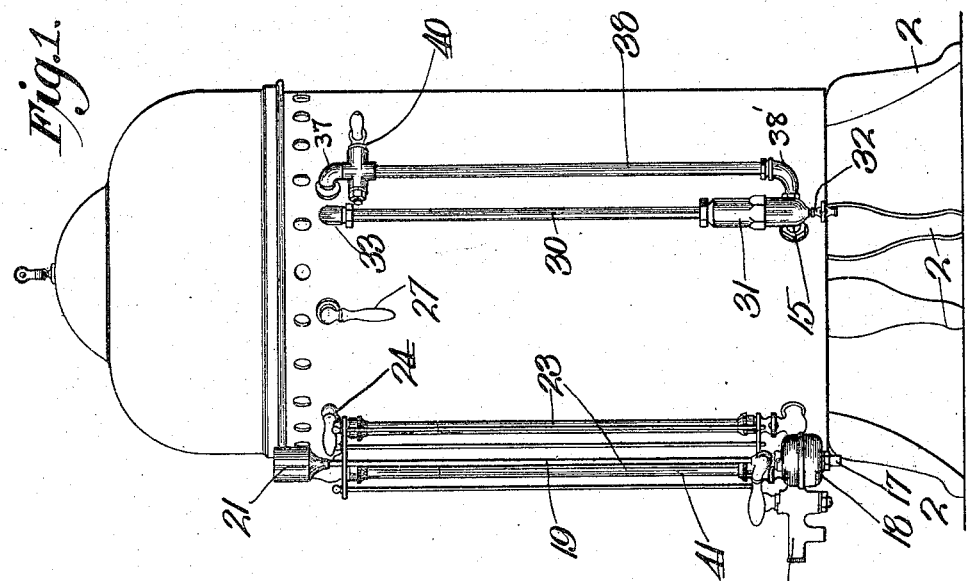
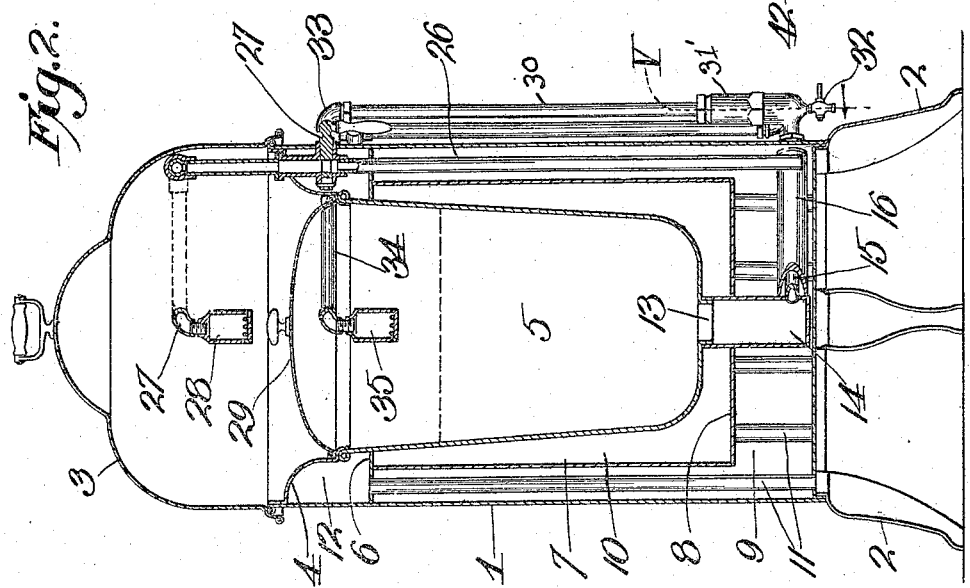
Witnesses
Frank R Glos
M. K. Preston
Inventor
H. D. Kelly
By George Y Thorpe Atty.

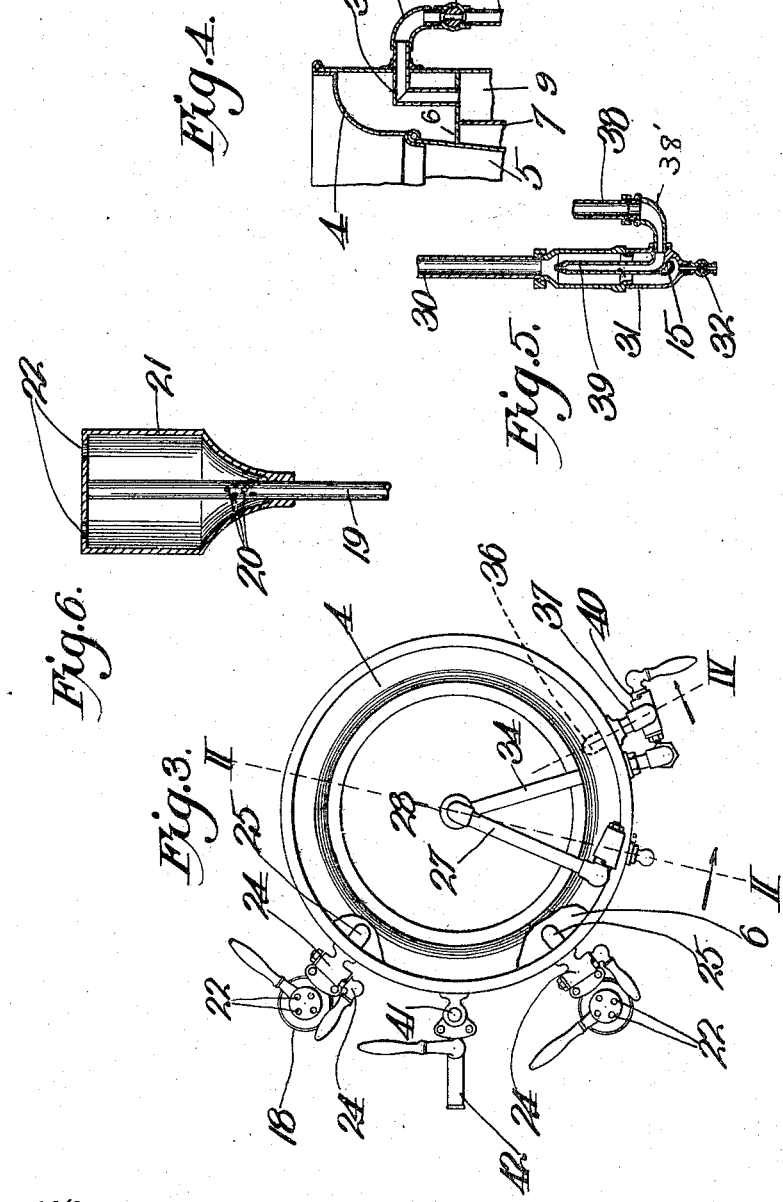

UNITED STATES PATENT OFFICE.

HENRY D. KELLY, OF KANSAS CITY, MISSOURI.

HOT-MILK-SERVING URN.

1,189,576.　　　　　Specification of Letters Patent.　　　Patented July 4, 1916.

Application filed July 15, 1912. Serial No. 709,602.

*To all whom it may concern:*

Be it known that I, HENRY D. KELLY, a citizen of the United States, residing at Kansas City, in the county of Jackson and State of Missouri, have invented certain new and useful Improvements in Hot-Milk-Serving Urns, of which the following is a specification.

This invention relates to milk serving urns, and has for its object to produce a device of this character whereby milk may be sterilized and maintained at the desired temperature, and at the same time kept thoroughly agitated to prevent the cream rising to and forming scum at the surface of the milk.

Another object is to provide an urn of the character mentioned having a faucet and gage glass or column and means whereby such faucet and gage glass or column may be thoroughly and expeditiously cleaned by circulating steam and boiling water through them.

Another object is to produce means for spraying hot water upon the interior surface of the milk jar of the urn for the purpose of thoroughly cleansing the jar after the milk has been drawn therefrom.

With these general objects in view, the invention consists in certain novel and peculiar features of construction and organization as hereinafter described and claimed; and in order that it may be fully understood reference is to be had to the accompanying drawings, in which:—

Figure 1, is a side elevation of an urn embodying my invention. Fig. 2, is a vertical section of the urn taken on the line II—II of Fig. 3, with the cover in position. Fig. 3, is a top plan view of the urn, with the cover omitted. Fig. 4, is a fragmentary section on the dotted line IV of Fig. 3. Fig. 5, is a vertical section on the dotted line V of Fig. 2. Fig. 6, is an enlarged vertical section of a guard for preventing any possible chance of overflowing of milk from the vent or air escape tube of the faucets.

Referring now to the drawings in detail, 1 indicates the casing of the urn, the same being mounted preferably upon supporting legs 2 and equipped with a removable cap 3.

4 is a ring secured to and within the upper end of the casing and forming the point of suspension for a milk jar 5.

6 is a horizontal partition ring between the casing and the jar, and 7 is a cylinder having a bottom 8, inclosing the jar below the partition 6 and dividing the casing into a water chamber 9 and an air chamber 10, and in order to raise the water supplied to the water chamber 9 by a house pipe (not shown), to a boiling temperature in a short space of time, flues 11 are arranged within the casing around cylinder 7, and extend through the bottom of the casing and the partition 6 thereof, so that heat may pass into the chamber 12 surrounding the jar above partitions 6, the heat being preferably generated by means of a burner (not shown) underlying the casing.

The jar is provided at its lower end with a discharge opening 13 communicating with a distributer 14, and extending from said distributer through the casing, is a number of distributing pipes 15, (only one being shown). To prevent the chilling of milk standing in pipes 15, when cold water is turned into the water chamber, tubes 16 fit around pipes 15 without contact therewith, and extend from the distributer 14 to the casing, and are secured to the distributer and casing with a water-tight joint. It will thus be seen that each tube 15 is insulated from cold water by an air jacket.

At the outer ends of all of the tubes 15 except one, are faucets 17, each faucet having a measuring cup 18 which is not detailed as it may be of any suitable type, and extending upward from each measuring cup to facilitate the escape of air with which the same is charged as the faucet is closed after each discharge of milk, is a tube 19 provided at a point above the water level, with perforations 20. Fitting over the upper end of each tube 19 and inclosing the perforations 20 thereof, is an inverted bottle-shaped cap 21 having exit-openings 22 for air. By this construction any milk which may be carried up in tube 19 by the escaping air, will be caught in the bottle shaped cap 21, and, as the air is exhausted, will flow back into the tube 19 through the perforations thereof and enter the cup. In practice the tube 19 will be small and the quantity of milk which passes up into the cap and back again into the cup will be so small as to be negligible in comparison with the capacity of the cup, it being understood that the milk has no opportunity to enter the cup in quantity except when the faucet is open and that consequently practically all the milk which enters the cup is discharged by the faucet.

To indicate the quantity of milk standing in the urn, I employ the usual gage glasses 23. The lower end of the gage glasses are connected to the faucets and their upper ends to valves 24, mounted on pipes 25, which pipes extend through the chamber 12, and partition 6, into chamber 9 and are adapted to receive steam when said valves are open, as hereinafter explained.

26 is a pipe arranged with its lower end in and near the bottom of the water chamber 9 and its upper end projecting up into the cover or the urn, and said pipe is controlled by a valve 27 which extends outwardly through the casing for convenience of operation. Pivotally connected to and communicating with the upper end of pipe 26 is a pipe 27', which in operative position, extends radially inward and terminates in a depending spray nozzle 28 adapted for discharging water into the jar 5, when the cover 29 of the same is removed.

30 is a pipe arranged at the outer side of the casing, and preferably enlarged at the lower end to form a chamber 31, with which communicates the outer end of the pipe 15, not connected to a faucet, and at the lower extremity of said chamber is a pet-cock 32 for drainage purposes. The upper end of pipe 30 is connected by an elbow 33 to a radially-arranged pipe 34 extending into the casing and over the jar and terminating in a down-turned spray nozzle 35, the arrangement being such that hot milk shall circulate from the jar through distributer 14, pipe 15, chamber 31, pipe 30, elbow 33, pipe 34 and spray nozzle 35 back into the jar, through the action of a steam injector. The injector consists of an elbow pipe 36 communicating with the upper end of the water chamber, an elbow 37, a vertical pipe 38, an elbow 38' connecting the lower end of pipe 38 to chamber 31 and an upturned nozzle 39 extending from the elbow upwardly into the chamber 31, as shown in Figs. 4 and 5. The passage of steam from the upper end of the water chamber through the injector is controlled by a valve 40.

Assuming that the water chamber 9 contains water at the boiling point and that the jar 5 is charged with milk to about the depth indicated by dotted lines, Fig. 2, and that the valve 40 is open, it will be seen that steam is constantly passing from the upper end of the water chamber and into pipe 30 and is therefore acting as an injector to circulate milk from the jar through the connected pipe 15 to pipe 30 and through pipe 34 and the spray nozzle upon the body of milk in the jar, this circulation tending to guard against cream rising to and scumming upon the surface of the milk and hence keeping the milk of uniform quality and temperature. The capacity of the injector is so limited that it only introduces approximately a pint of water into the jar during a period of about six hours during which time it is practicable to serve several jars of milk.

For quickly heating and sterilizing cold milk in the jar, the faucets are closed and valves 24 are opened. This permits live steam from the water chamber to pass up through pipes 25, down through the water gages and back through the faucet-supplying pipes 15, into the distributer 14 and thence up through the milk therein and into the jar. If it is desired to thoroughly sterilize and cleanse the faucets, they may be opened and a portion of the steam following the course last described, will escape through the faucets to the atmosphere, and incidentally pass through the measuring cups, it being of course practicable to thus sterilize and cleanse the faucets only when the jar is empty.

When it is desired to thoroughly cleanse the jar, when empty, valve 27 is opened to permit the steam in the upper part of the water chamber to force water through pipe 26, pipe 27' and the spray nozzle 28, the latter discharging the hot water forcibly against the interior of the jar and thoroughly cleaning the same.

The urn is provided with the customary hot water gage 41 and a faucet 42 at the lower end of same by which to draw hot water when desired; this gage and faucet, of course, form no part of the invention and are referred to only because they appear in the drawing.

From the foregoing it will be apparent that I have produced a thoroughly sanitary urn in which to heat and from which to serve the heated milk, and while I have illustrated and described the preferred embodiment of the invention, it is to be understood that I reserve the right to make such changes in its form, proportion, detail construction and in the organization of its parts as properly fall within the principle of construction defined by the appended claim.

I claim:

The combination of a boiler, a jar therein, a tube connected to the bottom of the jar and projecting through the wall of the boiler, a measuring cup faucet at the outer end of the tube, a tube extending upward from the measuring cup and provided above the water level of the boiler with one or more perforations, and an inverted bottle-shaped cap inclosing the upper end of the perforated tube and the perforations thereof, and provided with an air-escape opening.

In testimony whereof I affix my signature in the presence of two witnesses.

HENRY D. KELLY.

Witnesses:
M. K. PRESTON,
G. Y. THORPE.

Copies of this patent may be obtained for five cents each, by addressing the "Commissioner of Patents, Washington, D. C."